UNITED STATES PATENT OFFICE.

CLINTON M. BALL, OF TROY, ASSIGNOR TO THE VITRITE AND LUMINOID COMPANY, OF WATERVLIET, NEW YORK.

PROCESS OF MAKING INCANDESCENTS.

SPECIFICATION forming part of Letters Patent No. 346,345, dated July 27, 1886.

Application filed August 12, 1885. Serial No. 174,231. (Specimens.)

*To all whom it may concern:*

Be it known that I, CLINTON M. BALL, of Troy, in the county of Rensselaer and State of New York, have invented a new and useful Improvement in the Incandescing Medium for Electric Lighting, which improvement is fully set forth in the following specification.

This invention relates to the manufacture of a material for use as the incandescing medium of an incandescent electric lamp, and which may also be used for other purposes. The practice heretofore has been to use for such purpose metal wires or carbon in some of its many forms as made from animal or vegetable fiber, decomposed hydrocarbon, paper, cotton, linen, silk, hair, &c., but all resulting in the element carbon varied by such structural differences as may be due to the material carbonized.

I have discovered that from certain mineral substances or metallic compounds—such, for example, as alumina, or oxide of nickel combined with other elements—a mineral substance in the form of a wire may be produced which is eminently suitable for use as the incandescent of an electric lamp, and possesses the property of remaining stable at exceedingly high temperatures, and at the same time having sufficient electric conductivity to be operated economically by the electric current as a source of light. I find, further, that such mineral wire incandesces with a less expenditure of current than either metallic wires or carbon filaments, and is stable at light-giving temperatures. This wire may be made by several methods and with many differect elements and in varying proportions. I therefore do not confine myself to any one method or to specific materials or proportions, as these may be varied according to the purposes required, and by such variations in the relative proportions or materials used or entering into the composition of the wire its conductivity or resistance can be altered and thereby adapted to be used in conjunction with currents of high or low potential, or to effect a variation in candle-power.

In order to enable those skilled in the art to which the invention appertains to make and use the same, I will describe a way in which the principle of the said invention may be carried into effect.

I take a body of a suitable porous material, or material having interstitial spaces, which is or may be converted into a conductor of electricity, and incorporate therewith a metallic compound adapted to the purpose of producing the desired incandescent. There are a great many substances which will serve as a basis for the first steps of the process— such as any common spun porous material, for example, a slack twisted sea-island cotton yarn or thread—although many other materials may be substituted therefor. This body or base is saturated with a metallic salt or compound—as, for example, aluminium chloride. The body is then treated with a proper decomposing agent, such as a strong solution of ammonia. In the double decomposition which ensues the metallic compound or salt with which the pores of the body are filled is converted into a metallic oxide (alumina, if a compound of aluminium be used) which is insoluble and a soluble chloride of ammonia. The latter is then removed, as by dissolving or immersion in hot water. The object of the process up to this point is to produce an organic body having pores or insterstitial spaces which are filled with a metallic oxide suitable for the purposes of the invention. The body is then still further impregnated with and enveloped in metallic oxide directly. This may be aluminium oxide as before formed into a pasty condition by admixture with a small quantity of starch or other binding agents. I then further treat the body thus formed by converting it into the form of a wire more perfectly by rolling or drawing through a die, or both. The surface of the wire may be and preferably is smoothed and polished by the action of burnishing-rolls, or by any other suitable treatment. The product now obtained is a smooth, dense, highly-polished, coherent, wire-like body, which may be cut into lengths and shaped into loops as required. To render these shapes permanent, to expel any volatile matter that may remain in the article as the result of the treatment described, and to effect a thorough incorporation or union of the different elements, it is first heated to a red heat in a closed muffle and finally electrically heated to a high incandescence in a vapor of an organo-metallic body corresponding to the oxide already used in the treatment. Thus, for example, if alumina has been incorporated in the first stages of the process, the proper substance to employ in connection with the final heating would be an ethyl or methyl compound of aluminium associated with an oxidizing agent, and for the purposes of the invention the latter may suitably consist of watery vapor mingled with the aforesaid vapor of the organo-metallic body. The incandescing medium being thus brought into contact with these vapors effects a decomposition of the latter, liberating hydrogen and effecting a deposition of the other elements in and upon the incandescent body itself under the influence of the high temperature, and entering into a chemical combination therewith and producing a practically homogeneous substance. In the case here given these elements would be carbon and alumina, it is believed. The treatment described would so far alter the original structure of the incandescing medium as to convert it from a porous substance having a metallic oxide mechanically associated therewith into a homogeneous mineral compound. Under the microscope its surface and fracture through the mass exhibit a dense granular appearance without the characteristic of pores, fibers, or cells. After being subjected to intense electric action, as when used as a source of light, no cracks or scales or other alterations of conditions occur, such as would be shown in case of imperfect homogeneity. The surface and fracture show a metallic luster similar to steel and appears very much like it in structure. Individual specimens from the same lot present a uniform appearance, while peculiarities of structure are observable in different lots, arising from the use of different metals. This indicates a complete combination or union of the constituents.

As a means of providing a thorough incorporation of the elements, as above noted, I will state that when specimens produced in the above manner are subjected to the action of reducing agents and conditions whereby combined carbon is removable, there always remains a residuum of metallic oxide which retains the same form as before the elimination of the carbon. Further analytical tests show the character of the metal oxide remaining.

The indicated mode of treating an organic body by saturation with a solution of aluminium chloride and then subjecting to the action of a decomposing agent may be supposed to result in a material or substance containing in its pores or interstices the insoluble oxide. The paste subsequently applied corresponds in chemical character to the organic bodies and deposited oxide. The first heating or baking decomposes the organic body, and by the electrical heating of the wire in contact with the organo-metallic vapor a new combination is effected of a somewhat obscure character, the resulting substance in the present state of the art being difficult to define chemically. It may, however, be safely concluded from the indications given above that a practical homogeneous compound is produced, and that carbon in a free state does not exist therein. This is further indicated by the fact that when incandescents prepared as above are subjected to continued use they do not fall off in candle-power, as do all those heretofore made containing free carbon in one or another form, which appears, by some effect of the different electrical conditions within and without the globe or bulb, due to the vacuum therein, to be gradually deposited on the walls of the globe, thus increasing the resistance of the incandescents and darkening the glass.

The incandescing body prepared as above described has a high degree of strength and elasticity and resists the disintegrating action of the electric current when used as a source of light. Especially is it found to be perfectly stable at the highest attainable temperature *in vacuo*. It possesses conductivity to the degree proper for the purpose proposed, which degree may be varied by changing the proportions or materials employed, and it incandesces with comparatively small expenditure of current.

As already stated, the mode of carrying the invention into effect may be modified. Thus, instead of employing aluminium chloride as the metallic salt, some other compound—as nickel sulphite—may be used in the first stages of treatment. In this case sodic hydrate would be used as a decomposing agent to effect a decomposition of the sulphate and precipitation of the oxide. The nickel series should be followed in the selection of agents to be employed in the other stages of the process, including the use of ethyl or methyl compounds of this metal in connection with the electrical heating in contact with the vapors thereof.

Again, the invention may also be carried into effect by combining the indicated elements in a pulverulent form of condition, associated with a suitable binding agent to form a mass of proper consistence, and forcing through the die, and then subjecting the wire so formed to heat in like manner and under similar conditions as in the former case.

Having now fully described the principle of my said invention and pointed out the manner in which the same is or may be carried into effect, what I claim is—

1. The process of manufacturing incandescents, which consists in subjecting a carbonaceous substance to the action of high heat in the presence of an organo-metallic vapor, or vapor of an organo-metallic compound, substantially as described.

2. In the process of manufacturing incandescents, the improvement consisting in applying a metallic oxide to a suitable body, such as specified, uniting them into a coherent body, then heating to a red heat in a closed muffle, and finally electrically heating in the vapor of an organo-metallic body, substantially as described.

3. In the manufacture of the incandescent for an electric lamp, the process of consolidating the structure of the same and regulating its resistance, consisting in electrically heating it in contact with the vapor of an organo-metallic compound, substantially as described.

4. The herein-described process of manufacturing an incandescent by saturating a suitable body with a metallic salt—such as chloride of aluminium—then acting thereon with a decomposing agent—such as ammonia—then heating to a red heat in a closed muffle, and finally electrically heating in presence of a suitable organo-metallic vapor—such as ethide of aluminium, substantially as set forth.

5. In the process of manufacturing incandescents, the improvement consisting in saturating a porous carbonaceous body with chloride of aluminium or its equivalent, subjecting the same to the action of a decomposing agent, whereby the pores of said body become filled with an insoluble metallic oxide, then applying a paste containing the oxide of the same metal to the said body, shaping into a wire, then heating in a closed muffle, and finally electrically heating in the presence of the vapors of a suitable organo-metallic body, substantially as described.

In testimony whereof I have signed this specification in the presence of two subscribing witnesses.

CLINTON M. BALL.

Witnesses:
HENRY EDMUNDS,
HENRY A. HOWARD.